United States Patent [19]
Castel et al.

[11] Patent Number: 5,454,279
[45] Date of Patent: Oct. 3, 1995

[54] BRAKE-BOOSTER DEVICE PARTIAL VACUUM TYPE FOR A VEHICLE FITTED WITH DIRECT BRAKING CONTROL MEANS

[75] Inventors: Philippe Castel, Paris; Pierre Pressaco, La Courneuve, both of France

[73] Assignee: AlliedSignal Europe Services Techniques, Drancy, France

[21] Appl. No.: 122,556

[22] PCT Filed: Sep. 10, 1993

[86] PCT No.: PCT/FR93/00866

§ 371 Date: Sep. 30, 1993

§ 102(e) Date: Sep. 30, 1993

[87] PCT Pub. No.: WO94/07716

PCT Pub. Date: Apr. 14, 1994

[30] Foreign Application Priority Data

Oct. 7, 1992 [FR] France .................... 92 11865

[51] Int. Cl.[6] .................. F16C 1/10; B60T 8/34
[52] U.S. Cl. .................. 74/500.5; 303/113.4; 303/114.3; 303/113.3; 188/356
[58] Field of Search .................. 74/606 R, 523; 477/183; 303/113.4, 114.3, 113.3, 113.2, 100, 13, 14; 180/197; 188/356, 357

[56] References Cited

U.S. PATENT DOCUMENTS

| | | | |
|---|---|---|---|
| 4,610,483 | 9/1986 | Matsumoto et al. | 303/114.3 |
| 4,819,996 | 4/1989 | Belart et al. | 303/114.3 |
| 5,072,996 | 12/1991 | Heibel et al. | 303/114.3 |
| 5,098,170 | 3/1992 | Watanabe | 188/356 X |
| 5,141,295 | 8/1992 | Burgdorf et al. | 303/114.3 X |
| 5,181,769 | 1/1993 | Schiel et al. | 303/114.3 |
| 5,312,173 | 5/1994 | Rossigno | 188/356 X |
| 5,338,107 | 8/1994 | Rossigno et al. | 303/113.3 |
| 5,350,225 | 9/1994 | Steiner et al. | 303/114.3 X |

FOREIGN PATENT DOCUMENTS

| | | | |
|---|---|---|---|
| 2234026 | 1/1991 | United Kingdom | 303/113.3 |
| 92/18366 | 10/1992 | WIPO | 303/113.3 |

*Primary Examiner*—Vinh T. Luong
*Attorney, Agent, or Firm*—Larry J. Palguta; Leo H. McCormick, Jr.

[57] ABSTRACT

The invention covers a brake-booster of the partial vacuum type comprising a direct braking control mechanism (hillholder or traction control). In order to implement these functions, the piston (20, 22) of the booster is "double" through a partition (52) which is attached securely to the piston and defines with the piston a third chamber (50). This chamber is connected by a flexible pipe (66) and a double valve (72) either to partial vacuum (78) or to atmospheric pressure (76).

4 Claims, 3 Drawing Sheets

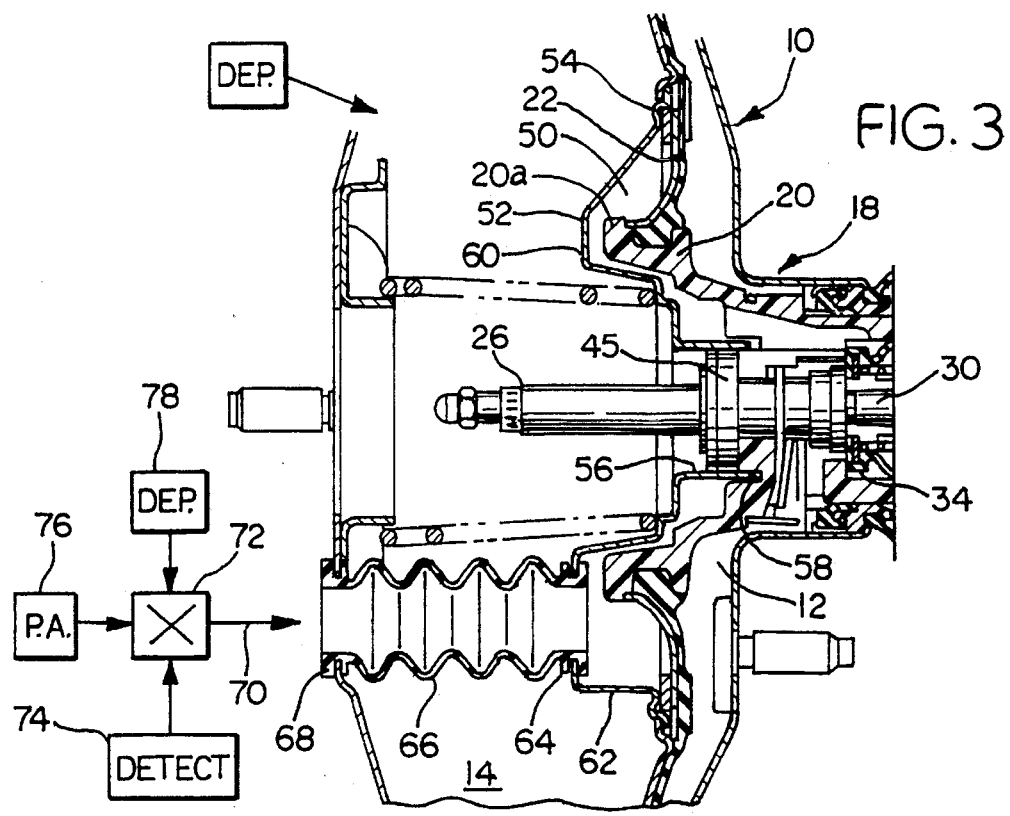

BRAKE-BOOSTER DEVICE PARTIAL VACUUM TYPE FOR A VEHICLE FITTED WITH DIRECT BRAKING CONTROL MEANS

FIELD OF THE INVENTION

The present invention has as its subject a brake-booster device of partial vacuum type for a vehicle fitted with direct braking control means comprising: an enclosed space; a deformable diaphragm separating said space into a first chamber and into a second chamber connected to a first pressure source delivering a first pressure; a member forming a piston securely attached to the central part of said diaphragm and bearing a reaction disk; a movable member for control of braking by the foot; means for placing in communication carried by the member forming a piston and capable of selectively placing the first chamber in communication with the first pressure source or with a second pressure source delivering a second pressure higher than said first pressure, according to the position of said member for control of braking by the foot; means for detection of parameters for which a direct braking has to be operated; means forming a partition which are securely attached to said member forming a piston so as to define with the latter a third chamber, said means forming a partition isolating said second chamber from the means for placing in communication; and means for selectively connecting said third chamber to the first or to the second pressure source in response to a signal delivered by said detection means.

DESCRIPTION OF THE PRIOR ART

The use of a booster interposed between the brake pedal of a vehicle and the master cylinder directly controlling the actuation of the brakes is well known and has the object of reducing very substantially the force which the motorist has to apply on the pedal in order to obtain the braking. Moreover, it is desired in some circumstances to provide the brake system with means which make it possible to control the action of the brakes even if the motorist is not pressing on the brake pedal. This is for example the case when a vehicle is moving on a downward slope of steep gradient or possibly in other circumstances. These systems comprise one or more detectors of running or attitude parameters of the vehicle which directly control the action of the brakes. These systems are known by the English term "Hill Holder" or "Traction Control". In the present text, the expression "direct control means" covers these different systems.

Systems of this type are for example described in documents EP-A-0,347,583, EP-A-0,171,585 and EP-A-0,303,470.

Whatever their effectiveness, the solutions illustrated in these documents have the drawback of requiring significant alteration of the piston, and in particular the piston body, with respect to the conventional configuration as represented in FIG. 1, or an entirely specific piston, in order to allow direct application of atmospheric pressure into the back chamber under the effect of direct control.

Such a requirement makes it difficult to fit this system on mass-produced vehicles, in particular if it involves a large number of specific parts for producing the booster, which parts additionally necessitate a special type approval.

SUMMARY OF THE INVENTION

In this context, one object of the present invention is to provide a brake-booster device which comprises direct braking control means, in which the various parts of the conventional booster can be retained.

In order to achieve this object, according to the invention, the partial vacuum type brake-booster device as defined in the preamble is essentially characterized in that said member forming a piston comprises a skirt and a central part comprising said means for placing in communication, and in that said means forming a partition comprise a part, the periphery of which is securely attached in a leak-tight manner to said skirt, said third chamber being formed between said part on the one hand and said skirt and said central part on the other hand.

It is therefore clear that, by virtue of the invention, a brake-booster structure of conventional type is started with, to which is added a partition securely attached to the piston of the deformable diaphragm in order to produce the third chamber.

Preferably, said means forming a partition comprise a cylindrical central part surrounding the reaction disk and providing the leaktightness between said second and third chambers.

Also preferably, means for placing in communication comprise a pipe with a deformable wall passing through the second chamber and a first end of which is connected to said part form in partition and the other end of which opens to the outside of said casing.

BRIEF DESCRIPTION OF THE DRAWINGS

Further characteristics and advantages of the present invention will emerge more clearly on reading the description which follows of several embodiments of the invention, which are given by way of non-limiting examples. The description refers to the attached figures, in which:

FIG. 3 is a view in vertical cross section of a booster of partial vacuum type fitted with direct braking control means according to the invention; and FIG. 4 shows in perspective and in partial cross section the means used in order to produce the third chamber serving for the direct braking control.

DESCRIPTION OF THE PREFERRED EMBODIMENT

In order the better to understand the problems raised by the implantation of such direct braking control systems in a conventional brake-booster installation, a brake-booster of conventional type will be described briefly with reference to FIGS. 1, 2a, 2b.

Figure 1:
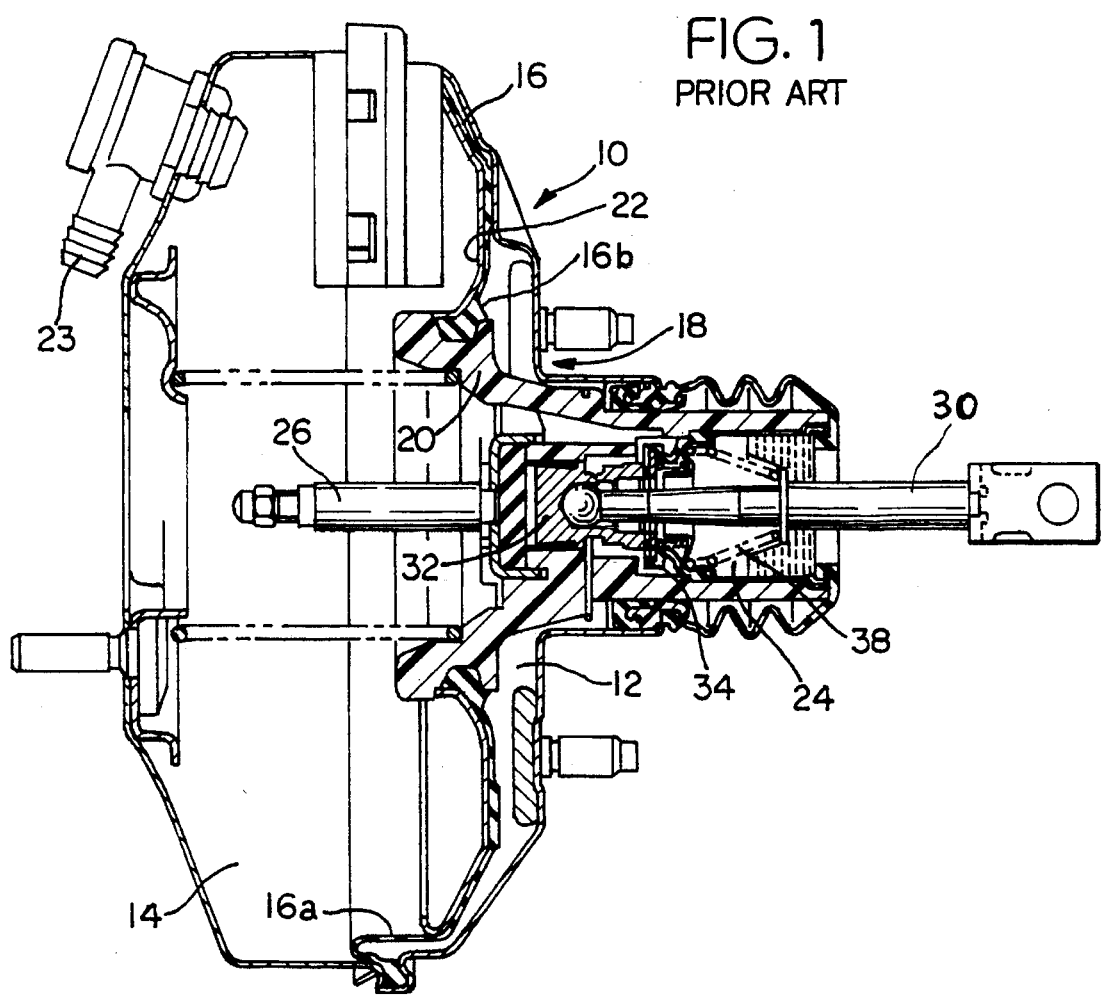
FIG. 1 shows in vertical cross section a known brake-booster of partial vacuum type.

As FIG. 1 shows, the booster comprises a casing 10 which is separated into a back chamber 12 and a front chamber 14 by a deformable diaphragm 16. The outer periphery of the diaphragm 16, referenced 16a, is securely attached to the casing whereas its inner periphery 16b is securely attached to an assembly forming a piston 18. The piston 18 comprises a body 20 and a peripheral skirt 22 on which the deformable diaphragm 16 partially bears. Into the front chamber 14 is permanently admitted by the means 23 a partial vacuum tapped at the engine. In the front chamber 14 is found either the partial vacuum tapped at the engine by placing in communication the back chamber 12 and the front chamber 14, or atmospheric pressure by interruption of the connection between the two chambers and by placing the back chamber 12 in communication with a zone 24 which is permanently at atmospheric pressure. It will of course be understood that, when the back chamber 12 is under partial vacuum, there is no braking since the two surfaces of the diaphragm are subject to the same pressure. On the other hand, when the back chamber 12 is placed at atmospheric pressure, the pressure difference acting on the deformable diaphragm and the assembly forming a piston 18 causes the movement of this assembly and in particular that of the thrust rod 26 securely attached to the piston 18. The movement of the thrust rod 26 controls the rise in pressure of the brake fluid in the master cylinder, not shown in the figures, this pressure rise producing in its turn the actuation of the brakes.

Figure 2A:
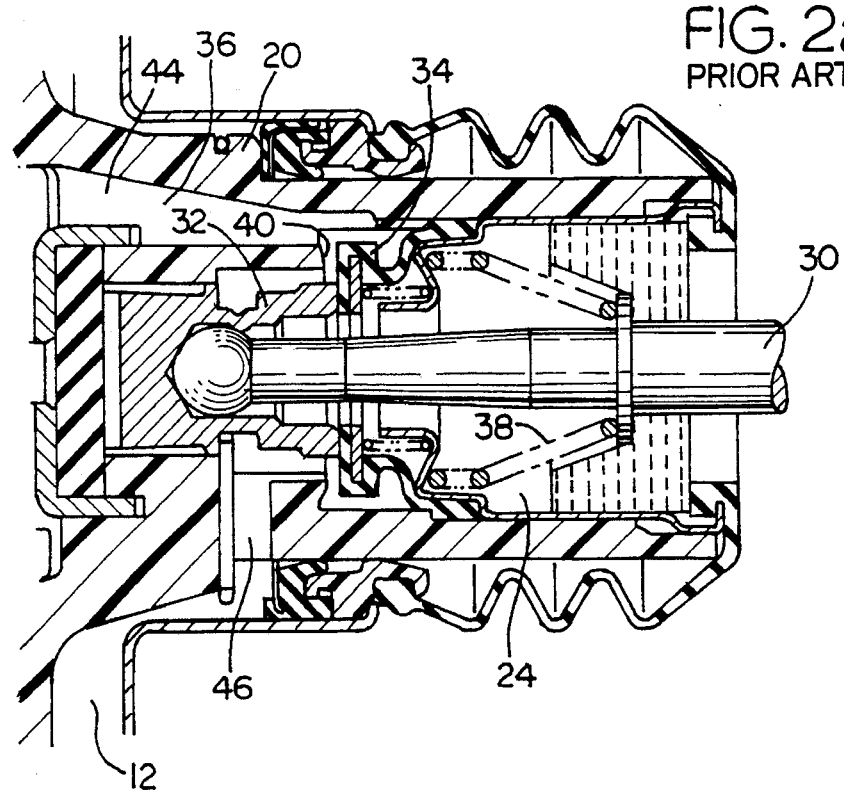
FIGS. 2a and 2b show a part of the booster of FIG. 1 during the braking and resting phases respectively.
Figure 2B:
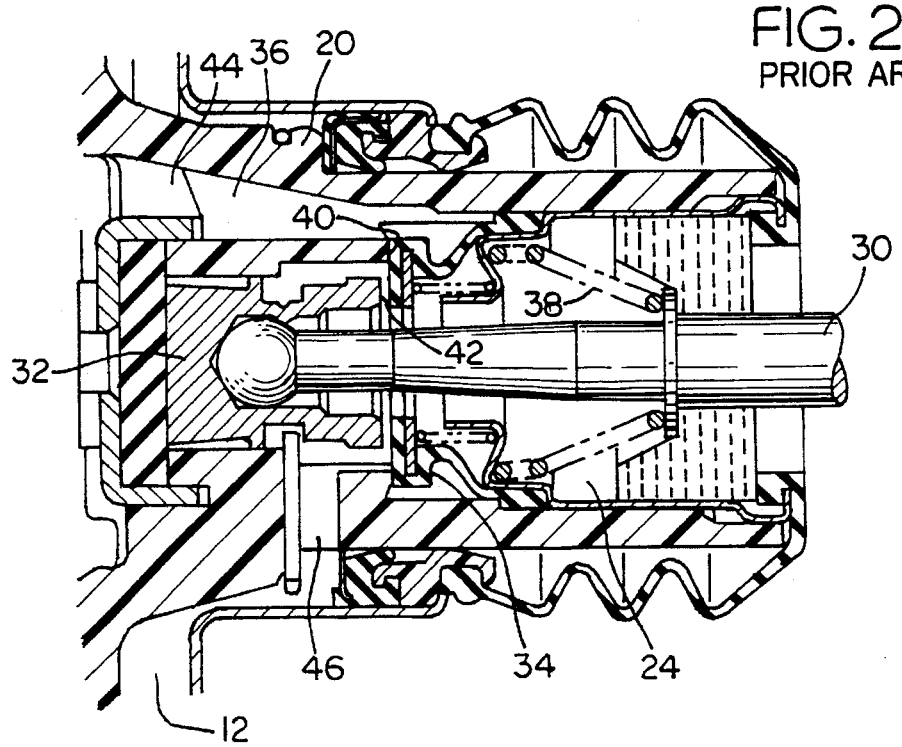

With reference now to FIGS. 2a and 2b, a more detailed explanation will be given of the manner in which, in these known systems, the front and back chambers are placed in communication during the resting phases of the booster, and of the manner in which the back chamber 12 is placed at atmospheric pressure when it is desired to operate a braking action.

The braking operation is produced by action on the brake pedal, not shown, which transmits its movement to a control rod 30. Its end is securely attached to a plunger distributor 32. In addition, an annular valve 34 surrounding the control rod 30 separates in leaktight manner the zone 24 at atmospheric pressure from a front zone 36. This valve 34 is subject to the action of a return spring 38 tending to move the valve 34 away from the chamber 24. As FIGS. 2a and 2b show, the piston body 20 defines internally a first annular bearing surface 40 which can interact with the valve 34. Similarly, the plunger distributor defines an annular bearing surface 42 concentric with the annular bearing surface 40 which can also interact with the valve 34. Passages 44 and 46 are also provided in the piston body 18.

When the booster is at rest, that is to say when no action is exerted on the control rod 30, the valve 34 bears against the bearing surface 42, which isolates the chamber at atmospheric pressure 24 from the posterior chamber 12. Simultaneously, the valve 34 is not in contact with the annular bearing surface 40, this permitting the back chamber 12 to be placed in communication with the front chamber 14 via the passages 44 and 46. This is what is shown in FIG. 2a.

When the control rod 30 is acted upon (FIG. 2b), the plunger distributor 32 is pushed back whilst the valve 34, under the effect of the return spring 38, comes to bear against the annular bearing surface 40 whereas this same valve 34 is no longer in contact with the annular bearing surface 42. In this position, the chamber 24 at atmospheric pressure is placed in communication with the posterior chamber 12 of the booster casing 10, whereby the back chamber is brought to atmospheric pressure, which produces the backward movement of the piston 18 and of the master cylinder control rod.

The fact of adding a direct braking control device to the brake-booster means that there are added, to the system previously described, means for controlling the admission of atmospheric pressure into the back chamber 12 of the casing 10 when the control rod 30 is not acted upon by a deliberate action on the part of the motorist.

With reference first of all to FIG. 3, the assembly of the booster fitted with the direct braking control means will be described. As has already been indicated, according to one feature of the invention, starting with a booster of conventional type, certain components are added thereto in order to permit the implementation of the direct braking control function. Therefore, in FIG. 3, the references already used in FIGS. 1 and 2a, 2b are reused in order to designate the various parts of the booster itself. In the following description, only the additional parts corresponding to the implementation of the direct braking control function will be explained.

In order to construct the third chamber referenced 50 in FIG. 3, there is mounted on the piston 18 a partition 52 preferably constructed of pressed sheet metal. The partition 52 comprises a peripheral part 54 serving for its leaktight mounting on the skirt 22 of the piston and a central part 56 forming an open cylindrical skirt. The rim of the skirt 56 enters an annular groove 58 made in the front surface of the central part 20 of the piston 18. The partition 52 comprises a bent intermediate portion 60 which corresponds in shape, while passing round it, to the periphery 20a of the piston. There is thus defined, between the piston 18 constituted by its central part and its skirt and the partition 52, the third chamber 50 which is thus isolated from the front chamber 14 and which communicates with the back chamber 12 via the means for placing in communication already described, and which are themselves controlled by the control rod 30. The control rod 30, plunger distributor 32, and annular valve 34 comprise a movable braking control member. The partition 52 further comprises on one portion of its intermediate part 60 a cylindrical sleeve 62 serving to connect in leaktight manner a first end 64 of a pipe 66 with a deformable wall. The pipe 66 passes through the front chamber 14 and its second end 68 is secured in leaktight manner onto the wall of the casing 10. The pipe 66 with a deformable wall which is, preferably, constituted by a bellows therefore makes it possible to connect the third chamber 50 with various sources of fluid as will now be explained.

The deformable pipe 66, or more precisely its end 68, is connected by an external pipe 70 to a three-way solenoid valve 72 the position of which is controlled by the signal delivered by an assembly 74 for detecting attitude or parameters running of the vehicle having to bring about the direct control of braking. The various possibilities and the various types of sensors are described in detail in the European patent already mentioned. It suffices to say here that, when the direct braking has to be operated, the valve 72 places the pipe 66 in communication with the atmospheric pressure 76 whereas, during all of the other phases of operation, the solenoid valve 72 places the pipe 66 in communication with the partial vacuum 78 tapped at the engine.

The functioning of the whole of the device follows easily from the preceding description. During the normal phases of operation, that is to say when the direct braking control is not active, the third chamber 50 is maintained under partial vacuum. Through the intermediary of the second means for placing in communication described previously, the back chamber 12 of the booster is therefore also maintained under partial vacuum so long as the motorist does not act on the brake pedal, that is to say on the control rod 30. More precisely, this placing in communication is performed by the passages 44 and 46 in the piston body 20 and the free space between the bearing surface 40 and the valve 34. During the deliberate braking operations, the only difference in functioning in comparison with that of a booster of conventional type consists in that the second means for placing in communication place the back chamber 12 in communication with the third chamber 50 instead of placing the back chamber 12 in communication with the front chamber 14. In contrast, when the braking control has to be actuated, the third chamber 50 is placed at atmospheric pressure. This third chamber communicates with the back chamber 12 if the motorist has not operated the braking himself. This placing in communication is performed as has previously been described. If the motorist has operated the braking, this communication does not exist but the deliberate braking operation has already placed the back chamber 12 in communication with the self-contained source 24 which is at atmospheric pressure.

FIG. 4 shows in greater detail a preferred embodiment of the part 52. The periphery 54 of the part 52 is provided with a series of regularly distributed catches 90. These catches can enter holes 92 made in the skirt 22 of the piston 18. An annular seal 94 interposed between these two parts produces the peripheral leaktightness of the third chamber 50. Preferably, the middle portion of the part 52 comprises a step 96 adapted to receive a cup 98 for retaining the reaction disk 45.

It will also be understood that the cylindrical skirt 56 of the part 52 further serves for the maintaining and for the guiding of the reaction disk 45 of the thrust rod 26; in so doing, the leaktightness between the front chamber 14 and the third chamber 50 is provided by the reaction disk 45.

What is claimed is:

1. A vacuum brake-booster device for a vehicle having direct braking control means, said booster comprising: a casing defining an enclosed space; a deformable diaphragm separating said enclosed space into a first chamber and a second chamber connected to a first pressure source delivering a first pressure; a piston attached securely to a central part of said diaphragm and bearing a reaction disk; a movable braking control member; communication means carried by the piston and capable of placing selectively the first chamber in communication with one of the first pressure source and a second pressure source delivering a second pressure higher than said first pressure according to positioning of said braking control member; detection means for detecting parameters for which a direct braking has to be operated; partition means which are attached securely to said piston to define with the piston a third chamber, said partition means isolating said second chamber from the communication means; and connection means for connecting selectively said third chamber to one of the first and second pressure sources in response to a signal delivered by said detection means, wherein said piston comprises a skirt and a central part comprising said communication means, and wherein said partition means comprises a wall having a periphery attached securely in leaktight manner to said skirt, said third chamber being formed between said wall, skirt and central part.

2. The booster device according to claim 1, wherein said partition means comprises a cylindrical central portion surrounding the reaction disk and providing leaktightness between said second and third chambers.

3. The booster device according to claim 2, wherein said communication means comprises a deformable pipe passing through the second chamber having a first end connected to said wall and a second end communicating exteriorly of said casing.

4. The booster device according to claim 2, wherein said wall is secured on said skirt by slots and catches.

* * * * *